United States Patent
Puchtler (10) Patent No.: US 6,892,153 B2
(45) Date of Patent: May 10, 2005

(54) ADAPTATION OF COMPENSATION DATA FOR REDUCING POSITIONING ERRORS IN MACHINE TOOLS AND ROBOTS

(75) Inventor: Thomas Puchtler, Adelsdorf (DE)

(73) Assignee: Siemens Aktiengesellschaft, München (DE)

( * ) Notice: Subject to any disclaimer, the term of this patent is extended or adjusted under 35 U.S.C. 154(b) by 188 days.

(21) Appl. No.: 10/292,814

(22) Filed: Nov. 12, 2002

(65) Prior Publication Data

US 2003/0144809 A1 Jul. 31, 2003

(30) Foreign Application Priority Data

Nov. 12, 2001 (DE) .......................................... 101 55 430

(51) Int. Cl.$^7$ .......................... G01L 25/00; G05B 19/18; G01D 18/00
(52) U.S. Cl. ........................... 702/105; 702/84; 702/85; 700/57
(58) Field of Search .............................. 702/81, 84, 85, 702/105; 700/54, 57, 78; 318/600, 632

(56) References Cited

U.S. PATENT DOCUMENTS 4,251,761 A * 2/1981 Inoue .......................... 318/630
5,227,978 A * 7/1993 Kato ........................... 700/189
5,726,896 A * 3/1998 Jia et al. ...................... 700/187

* cited by examiner

Primary Examiner—Bryan Bui
(74) Attorney, Agent, or Firm—Henry M. Feiereisen (57) ABSTRACT

In a method for compensating static positioning errors, in particular position and orientation errors, in guiding a movement of a movable machine element of an industrial processing machine, positioning errors are initially measured at startup of the machine and stored in a compensation table in a numerical controller (CNC). These values are used to generate reference values for compensating the errors. Deviations between the measured points in the table are interpolated. The actual position is measured during machining by using an additional measurement system and compared with the nominal position. Typically, the points of the measurement are different from the points in the compensation table. The compensation values can be improved continuously in two ways: on one hand, by extending the compensation table by adding the measured points and, on the other hand, by adapting the points of the compensation table adjacent to the corresponding measurement point.

27 Claims, 4 Drawing Sheets

ADAPTATION OF COMPENSATION DATA FOR REDUCING POSITIONING ERRORS IN MACHINE TOOLS AND ROBOTS

CROSS-REFERENCES TO RELATED APPLICATIONS

This application claims the priority of German Patent Application Serial No. 101 55 430.3, filed Nov. 12, 2001, pursuant to 35 U.S.C. 119(a)–(d), the disclosure of which is incorporated herein by reference.

BACKGROUND OF THE INVENTION

The present invention relates to a method for compensating static positioning errors, in particular position and orientation errors, in guiding a movement of a movable machine element of an industrial processing machine, such as a numerically controlled machine tool, a robot or the like, with a preset standard parameter for generating reference variables for one or more drives that control the machine elements in a predetermined workspace.

The construction of industrial processing machines requires, among other things, that the machine elements are precisely positioned in order to guarantee today's requirements for accuracy of, for example, workpieces that are to be manufactured with a numerically controlled machine tool.

One characteristic of actual machine tools and robots, in the following referred to as "machines", is their "absolute positioning accuracy." This accuracy is expressed in micrometers and degrees, respectively. Their required scale depends on the specific application. In the following, the two terms position and orientation errors are combined into a single term "positioning error." The positioning accuracy is weighted, among others, by:

Changes in the temperature on the machine and its environment

Gravitational forces on the tool holder

Deformation and wear of the machine elements

Spindle pitch errors in linear axes with ball screws

Sagging of the guide rails, for example caused by the weight of the tool and spindle of the machine tool Twisting and insufficient straightness of guide rails Angular errors between the guide rails Missing information about actual, geometric dimensions of components; frequently, dimensions from the drawings are used instead of the correct information With non-Cartesian machine tools and robots, the coordinate transformation of the controller is frequently based on only a simplified mathematical model in order to limit the computing time and keep the number of geometric parameters manageable.

Frequently, the positioning accuracy and in rare cases also the orientation accuracy is measured in the workspace after startup of a processing machine, using external measurement tools. Depending on the application, these values may not be sufficient for the reasons discussed above.

Certain methods have been established to compensate for the underlying causes spindle pitch error and sagging. Twisting and angular error can be compensated by defining narrow tolerances in the machine design. However, the complexity and expenses increase exponentially with the required accuracy, making the processing machine itself also more expensive.

The two latter sources for errors are frequently accepted; alternatively, improvements can be achieved by refining the mathematical model, which however increases the complexity of the software implementation and the required computer resources.

It would therefore be desirable and advantageous to provide an improved method to obviate prior art shortcomings and to decrease static positioning inaccuracies of machines.

SUMMARY OF THE INVENTION

According to one aspect of the present invention, a method is provided, wherein a compensation table (K) with compensation values (k) is provided for a predetermined number of different operating points (P0 . . . Px) in the workspace (A), wherein such compensation values are initially all initialized with the value 0 and added to generated reference variables, wherein for the reference variables located between the predetermined operating points a suitable compensation value is determined by interpolating adjacent compensation values in the compensation table, and wherein positioning errors occurring during a machining operation are determined, in particular measured, and used for adapting the compensation values of the compensation table, in that an existing associated compensation value is replaced by a new compensation value corresponding to the additional positioning error, if the positioning error coincides with a predetermined operating point, or otherwise the points of the compensation table adjacent to the corresponding measurement point are corrected at least partially according to the determined positioning error.

According to another aspect of the invention, a method is disclosed, wherein initially, possible first positioning errors are determined, in particular measured, for a predetermined number of different operating points (P0 . . . Px) in the workspace (A), and stored as compensation values (k) in a compensation table (K), wherein such compensation values are added to generated reference variables, whereby a compensation value is determined for reference variables located between the predetermined operating points by interpolating adjacent compensation values of the compensation table, and wherein during a machining operation additional positioning errors that occur are determined, in particular measured, and used to adapt the compensation values of the compensation table, in that an existing associated compensation value is replaced by a new compensation value corresponding to the additional positioning error, if the positioning error coincides with a predetermined operating point, or otherwise the points of the compensation table proximate to the corresponding measurement point are corrected at least partially according to the determined positioning error.

According to an advantageous embodiment, a compensation table (K) with compensation values (k) is provided for a predetermined number of different operating points (P0 . . . Px) in the workspace (A), wherein such compensation values are initially all initialized with the value 0 and added to generated reference variables, wherein for the reference variables located between the predetermined operating points a suitable compensation value is determined by interpolating adjacent compensation values of the compensation table, and wherein positioning errors that occur during a machining operation are determined, in particular measured, and used for adapting the compensation values of the compensation table, in that an existing associated compensation value is replaced by a new compensation value corresponding to the additional positioning error, if the positioning error coincides with a predetermined operating point, or otherwise, the compensation table is extended by the corresponding measurement point and the compensation value that corresponds to the positioning error determined at that measurement point.

According to another embodiment of the invention, initially, possible first positioning errors are determined, in particular measured, for a predetermined number of different operating points (P0 . . . Px) in the workspace (A) and stored as compensation values (k) in a compensation table (K), wherein such compensation values are added to generated reference variables, whereby a compensation value is determined for reference variables located between the predetermined operating points by interpolating adjacent compensation values of the compensation table, and wherein additional positioning errors that occur during a machining operation are determined, in particular measured, and used to adapt the compensation values of the compensation table, in that an existing associated compensation value is replaced with a new compensation value corresponding to the additional positioning error, if the positioning error coincides with a predetermined operating point, or otherwise, the compensation table is extended by the corresponding measurement point and the compensation value that corresponds to the positioning error determined at that measurement point.

Advantageously, an external measurement system can be used for determining positioning errors that occur during a machining operation, whereby the externally determined position is measured simultaneously with a reference variable. The first positioning errors are advantageously determined with a machine-internal measurement system.

Advantageously, the external measurement system can be adjusted during startup of the machine so as to minimize positioning errors.

If both internal and external measurement systems are used, the machine-internal measurement system should be adapted to the external measurement system or vice versa.

Advantageously, the method of the invention can be implemented and executed effectively if for determining the operating points, the workspace of the processing machine has a cuboid shape and is subdivided into a three-dimensional grid structure, wherein the difference between the nominal position and the measured actual position is stored for each grid point or a selection of grid points in a data field of the compensation table.

Advantageously, the compensation table can be formed as a data array. For each degree of freedom of the processing machine, the travel of the machine elements can be subdivided equidistantly. Each dimension of the workspace is described by a minimal value, a maximum value and a number of equidistant intervals.

If the measurement point of a positioning error occurring during the machining operation is located exactly between two predetermined operating points, then advantageously exactly two compensation values of adjacent operating points of the compensation table are corrected according to the measured positioning error.

Advantageously, if the measurement point of a positioning error occurring during the machining operation is located exactly in the center of a rectangle, then exactly four compensation values of the rectangle formed by four adjacent operating points of the compensation table are corrected according to the determined positioning error.

Otherwise, the eight compensation values of the operating points adjacent to the measurement point of a positioning error, that occurs during the machining operation, are corrected in the compensation table according to the determined positioning error.

According to an advantageous embodiment of the invention, adjacent compensation values for one or several coordinates are each corrected by setting the compensation values adjacent to the measurement point equal to the new compensation value associated with the determined positioning error.

Alternatively, according to another advantageous embodiment of the invention, adjacent compensation values for one or more coordinates can be corrected by shifting a straight line extending from the compensation value adjacent to the measurement point to the other adjacent compensation value so that the straight line extends through the new compensation value associated with the determined positioning error, whereby the end points of the shifted straight line form the corrected compensation values.

The method can advantageously be implemented computationally, in particular in software, by assuming $g = (1-t)g_i + tg_{i+1}$ with $0 < t < 1$ and $c = dx - (1-t)dx_i - tdx_{i+1}$, with the new compensation value (dx) associated with the determined positioning error, a first ($g_i$) compensation value ($dx_i$) adjacent to the measurement point (g), and an adjacent ($g_{i+1}$) second compensation value ($dx_{i+1}$), wherein the ($g_i$, $g_{i+1}$) new compensation values ($dx_{i,neu}$, $dx_{i+1,neu}$) adjacent to the measurement point (g) are defined according to $dx_{i,neu} = dx_i + c$ and $dx_{i+1,neu} = dx_{i+1} + c$.

According to another advantageous embodiment of the method of the invention, adjacent compensation values for one or several coordinates are each corrected by assuming $g = (1-t)g_i + tg_{i+1}$ with $0 > t > 1$ and $c = dx - (1-t)dx_i - t\, dx_{i+1}$ with the new compensation value (dx) associated with the determined positioning error, a first ($g_i$) compensation value ($dx_i$) adjacent to the measurement point (g), and an adjacent ($g_{i+1}$) second compensation value ($dx_{i+1}$), wherein the ($g_i$, $g_{i+1}$) new compensation values ($dx_{i,neu}$, $dx_{i+1,neu}$) adjacent to the measurement point (g) are defined according to $dx_{i,neu} = dx_i(1-t)c$ and $dx_{i+1,neu} = dx_{i+1} + tc$ The method according to the invention can also be implemented with numerical controllers requiring less computing power by measuring positioning errors occurring during a machining operation as a series of measurements and suitably adapting the compensation values of the compensation table after the machining operation is completed.

The compensation table can be extended without significantly increasing memory requirements by extending the compensation table only with an entry representing the mean value of the associated compensation values, if during a machining operation one or more positioning errors are measured for closely spaced measurement points.

Advantageously, the compensation values are weighted more, if the measurement points with measured positioning errors accumulate at certain positions or in a region around certain positions during a machining operation.

The compensation of positioning errors can be further improved with the invention by correcting adjacent compensation values for one or more coordinates by distributing the new compensation value associated with the measured positioning error at the measurement point over the adjacent compensation values weighted according to the position and/or weighting of the measurement point.

According to another embodiment of the invention, a compensation table can be generated and used by:

defining nominal positions for the machine element for a predetermined number of different operating points in the workspace, determining positioning errors by comparing the respective nominal position and actual position of the machine elements for each of these operating points, placing the respective nominal position and measured positioning error into a compensation table, taking the positioning errors of the compensation table into account as compensation values by adding the compensation values when reference variables for the drive(s) are generated from the preset nominal values in the respective nominal positions, or by interpolating the compensation values of the compensation table in the intervals of the corresponding nominal positions.

Advantageously, the method can be executed automatically during start-up of the processing machine, by accessing the desired positions in the operating space via a corresponding parts programs using travel commands for the defined nominal values, and measuring the attained actual positions after the corresponding position is reached and transferring the measured positions to the machine controller, where the deviations are measured as positioning errors and entered into the corresponding locations in the compensation table.

Static positioning errors can include static position errors and/or orientation errors.

The aforedescribed method for compensating static positioning errors according to the invention is particularly suited for quality control or quality assurance of an industrial processing machine.

According to the invention, the positioning accuracy can be increased by initially measuring positioning errors at startup and storing the measured positioning errors in a compensation table in a numerical controller (CNC). These values are used to generate reference values for error compensation. The deviations are interpolated between the measured points in the table. The actual position during machining can be measured with an additional measurement system and compared with the corresponding nominal position. The positioning error is typically composed of the sum of the above-reference quantities, with the deformation caused by machining forces and the contour spacings. The points where measurements are performed are typically different from the points stored in the aforedescribed compensation table.

According to another embodiment of the invention, the compensation can be further improved by the following measures:

The compensation table is extended by including the measured points. However, this would significantly increase the size of the compensation table over time. The invention provides also a solution for this partial problem, as described above. Problems can also arise in that different positioning errors are measured even for closely spaced points, for example, over long time intervals and possibly at significantly different temperatures, the measurements are used to suitably correct the points in the compensation table that are adjacent to the corresponding to measurement points. The user configures the compensation table before startup, e.g., a regular grid in the workspace. The size of the compensation table is then constant. Only the compensation values are updated based on measurements during machining. The different embodiments, i.e., strategies for updating the compensation values, will be described below with reference to advantageous embodiments.

The invention has, among others, the following advantages:

An adaptive quality control can be achieved for larger batch sizes of machined workpieces by repeated, sampled external measurements changing process parameters, such as temperature and wear, are constantly taken into account through updated compensation values distortions of the tool path caused by machining forces are registered via the online measurements; the compensation values are used during the next path to move the tool closer the to the programmed position.

External measurement devices can be used by the present invention not only for quality control, but also for quality assurance. The compensation table stored in the controller is updated exactly where the workpiece is machined, namely along the programmed machining paths. It is also possible to set all compensation values initially to 0 and to then learn the compensation values when the first workpiece is machined.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way.

The absolute positioning accuracy of a machine tool or a robot can be checked by using highly precise external measurement devices. The accuracy can be increased further by storing the measured deviations in a numeric controller and by taking the measured deviations into account when generating reference values.

According to the invention, positioning errors can thereby be reduced at least at the measured positions down to the repeating accuracy. A possible solution could here be a "Space Error Compensation" (SEC). The measurement points preferably form a regular grid in the work space. The position of the grid points can be sufficiently described by the boundaries of the grid and the number of grid points in each dimension. The compensation values between the grid points can then be calculated by linear interpolation in space with a comparatively small computation effort. This method and similar solution trials according to the present invention for further improving the compensation of positioning errors will be described hereinafter in detail.

Figure 1:
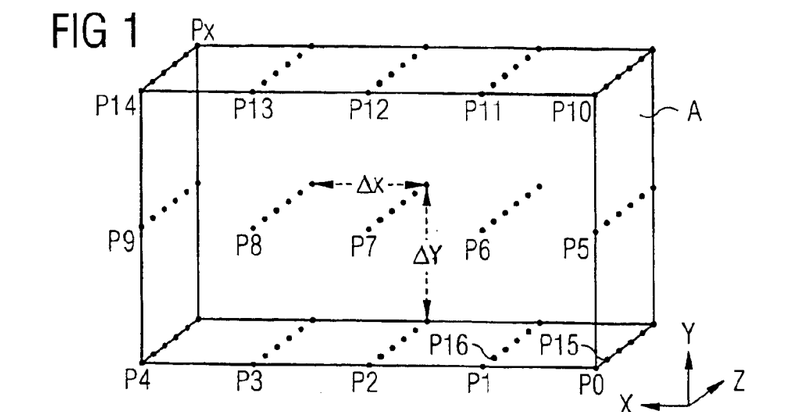
FIG. 1 a cuboid workspace with an equidistantly subdivided travel region.
Figure 2:
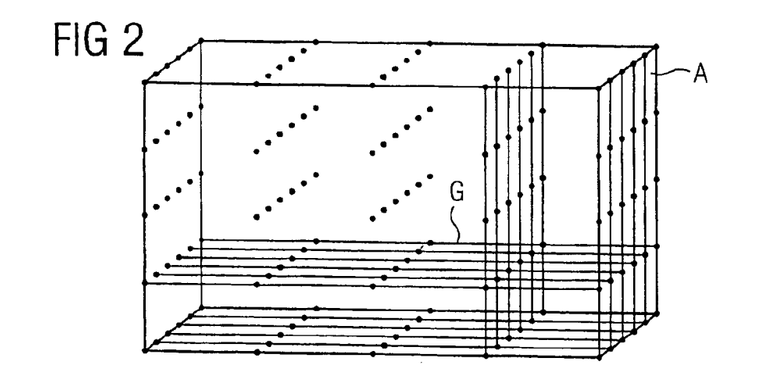
FIG. 2 a cuboid workspace for a machine element with a three-dimensional grid structure.

The following discussions refer to a workspace A depicted, for example, schematically in FIGS. 1 and 2. An existing positioning error and optionally also an orientation error are measured at the number of different operating points P0 . . . Px in the workspace A of the processing machine. The term "positioning" will be used hereinafter to describe both the position and the orientation.

Figure 4:
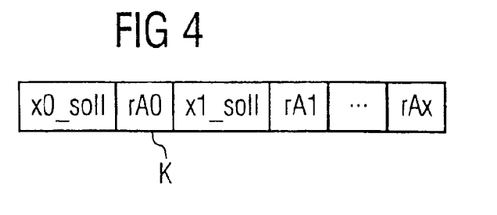
FIG. 4 an example of a compensation table for positioning errors.

The nominal positions X_soll are entered together with the corresponding positioning errors rA in a compensation table K. An exemplary compensation table K for positioning errors is depicted in FIG. 4, in that the nominal position X_soll and subsequently the corresponding positioning errors rA are placed in a list for all operating points P0 . . . Px.

These compensation values are taken into account for generating reference values from preset positions for drives (not shown) by correcting the corresponding nominal position values with the associated compensation values and outputting the corrected values as reference values for controlling the drives. This initially eliminates an existing positioning error at the measurement points and/or the selected operating points P0 . . . Px.

However, since the majority of possible operating points in the workspace A does not typically coincide with the measurement points, which only represent a representative selection of possible positions in the workspace A, an existing positioning error must also be corrected in the regions located between the measurement points.

According to the invention, the compensation values are interpolated in these intermediate regions from the compensation table K, thereby further decreasing the deviations in these intermediate regions.

The method according to the invention can be carried out by storing the measurement protocol, that relates to the absolute positioning and/or orientation accuracy and is generated when a machine tool or a robot is accepted, in suitable form in the controller in the form of a compensation table K (see FIG. 4). The compensation table can then be reused in the aforedescribed manner to increase the accuracy and reduce the deviations. The cost associated with implementing this method and the computation resources required of a numerical controller are relatively small.

Figure 3:
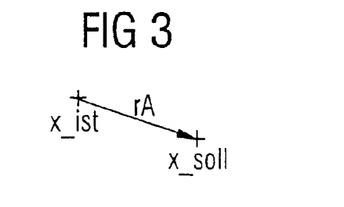
FIG. 3 the definition of a spatial deviation.

In a particularly effective implementation, a regular three-dimensional grid can be placed over a cuboid workspace A. This is shown schematically in FIG. 2, wherein the grid structure G is indicated. At each grid point, i.e., the operating point P0 . . . Px to be measured, the deviation between the nominal position and the measured position is entered into a data field. The deviation at the respective grid point can also be referred to as "spatial deviation" rA, as indicated in FIG. 3. The spatial deviation rA is actually a vector between the nominal position X_soll and the actual position X_ist at the desired operating point.

The values in the compensation table K can also be determined automatically. The processing machine can move to the desired positions in the workspace with the help of a parts program. After each position is reached, the actual position is determined, for example, by an external measurement device, and transmitted to the machine controller. The deviation rA can then be determined and together with position entered into the compensation table K.

The required memory locations of the compensation table K can be optimized with a suitable selection of the positions in the workspace. For example, for each degree of freedom (e.g. the dimensions X, Y, Z in FIG. 1) of the machine, the travel is equidistantly subdivided into spacings Δx and/or Δy, thereby placing the measurement points P0 . . . Px on a regular grid. This situation is based on the diagram in FIG. 1 which shows equidistant operating points P0 to P16.

Each dimension X, Y, Z is described by providing a minimum value, a maximum value, and a number of equidistant intervals. With this approach, the interpolation of the compensation values in the intervals becomes very simple and hence non-critical with respect to the run time and computation resources.

Important aspects of this invention are the external measurement of the position/orientation and updating the compensation table. At startup, the external measurement system has to be adjusted so that the positioning errors are small. Alternatively, the machine-internal measurement system can be matched to the external measurement system. During the measurement, time synchronization has to be observed, i.e., the externally measured position $X_{ext}$ has to be recorded synchronously with the actual values $q_{ist}$ of the machine.

With Cartesian machines, the position $X_{ist}=q_{ist}$, whereas with non-Cartesian machines, the position $X_{ist}$ is calculated from $q_{ist}$ by a forward transformation. The computing time and the data required to describe the operating points when updating the compensation table can be optimized by arranging the operating points in the form of the aforedescribed regular grid, as depicted in FIGS. 1 and 2.

The following three situations can arise for the position of the measurement point relative to the grid:

the measurement point is located exactly between two grid points and therefore has exactly two adjacent grid points the measurement point is located inside a rectangle formed by four adjacent grid points and therefore has four adjacent grid points in all other cases, the measurement point has eight adjacent grid points.

The process of updating compensation values k on adjacent grid points will now be described for the first case, i.e., when the spatial dimension has a single component, such as the X-coordinate.

Figure 5:
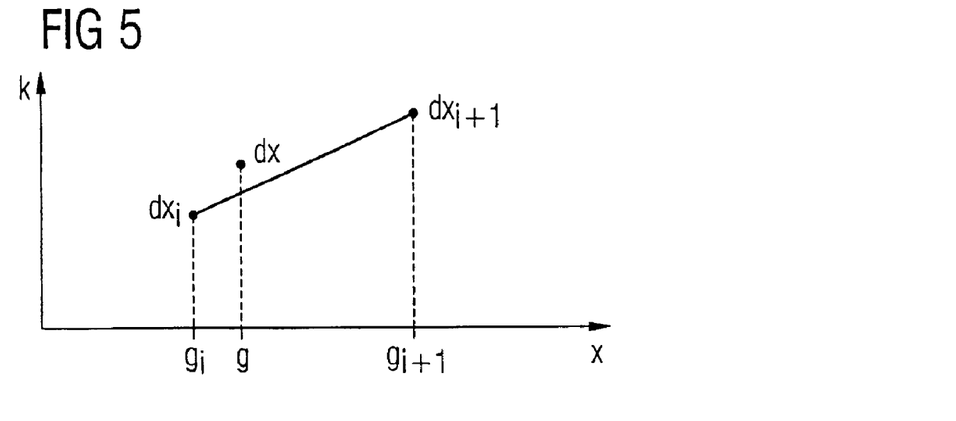
FIG. 5 a diagram of compensation values for a coordinate and/or spatial dimension with a measurement point and adjacent compensation values at predetermined operating points.

FIG. 5 shows the two corresponding neighboring points $g_i$ and $g_{i+1}$ of the grid and the associated compensation values $dx_i$ and $dx_{i+1}$. The straight line connecting these two points indicates that a compensation value k is to be linearly interpolated. The positioning error dx is to be determined at the measured point g.

The following two cases can be considered.

Case 1: $g=g_i$

The compensation value $d_i$ is then to be replaced by dx or more generally by setting:

$$dx_{i,neu}=dx_i+\lambda(dx-dx_i) \text{ with } 0<\lambda\leq1.$$

Case 2: $g =(1-t)g_i+tg_{i+1}$ with $0<t<1$

Several approaches for updating the compensation values, can be envisioned for this case, with several suitable exemplary approaches described below.

Figure 6:
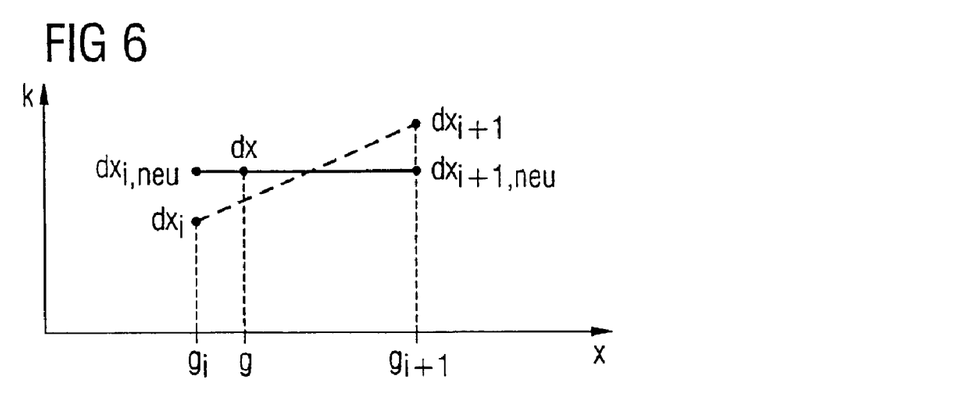
FIG. 6 a first approach for adapting adjacent compensation values to a new compensation value at the measurement point.

Approach 1 (graphically illustrated in FIG. 6):
By setting $dx_{i,neu}=dx_{i+1,neu}=dx$. the compensation value between $g_i$ and $g_{i+1}$ is then constant and equal to dx.

Figure 7:
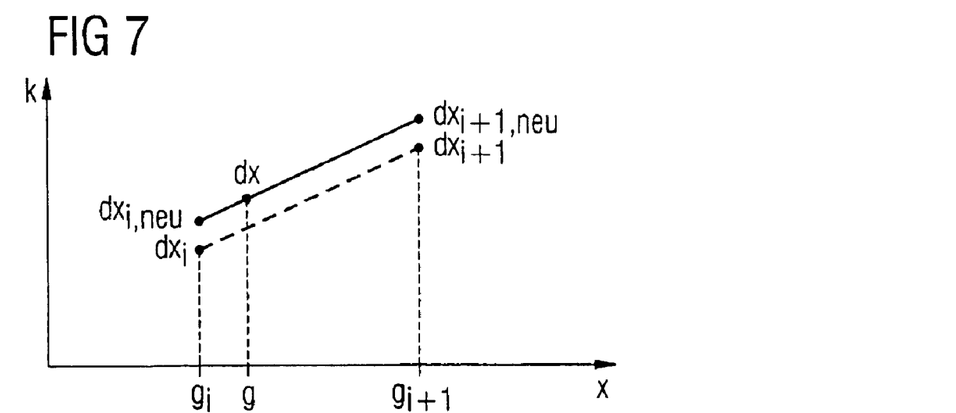
FIG. 7 a second approach for adapting adjacent compensation values to a new compensation value at the measurement point.

Approach 2 (graphically illustrated in FIG. 7):
The straight line between $(g_i, dx_i)$ and $(g_{i+1}, dx_{i+1})$ is shifted until it includes the point (g, dx), i.e., one sets $$c=dx-(1-t)dx_i-tdx_{i+1} \text{ and}$$

$$dx_{i,neu}=dx_i+c,dx_{i+1,neu}=dx_{i+1}+c.$$

Approach 3 (graphically illustrated in FIG. 8):
Both compensation values are corrected by a value smaller than c, e.g., $$dx_{i,neu}=dx_i+(1-t)c,dx_{i+1,neu}=dx_{i+1}+tc.$$

Figure 8:
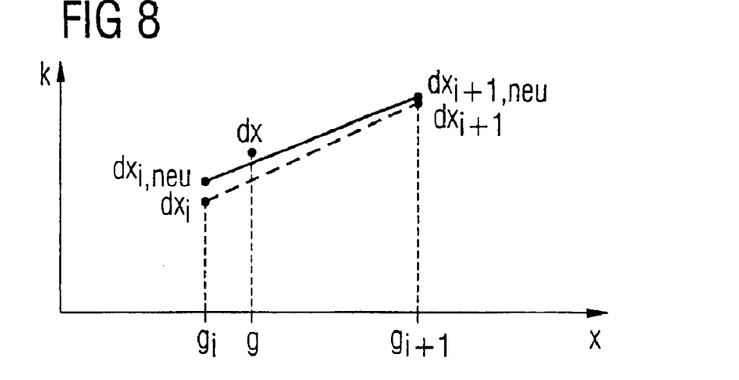
FIG. 8 a third approach for adapting adjacent compensation values to a new compensation value at the measurement point.

For t=0 and t=1, the compensation value is replaced at $g_i$ and $g_{i+1}$, respectively. A residual deviation 2t(1 −t)c remains at the position g. The residual deviation is assumed to have a maximum value of ½ c at t=½.

Figure 9:
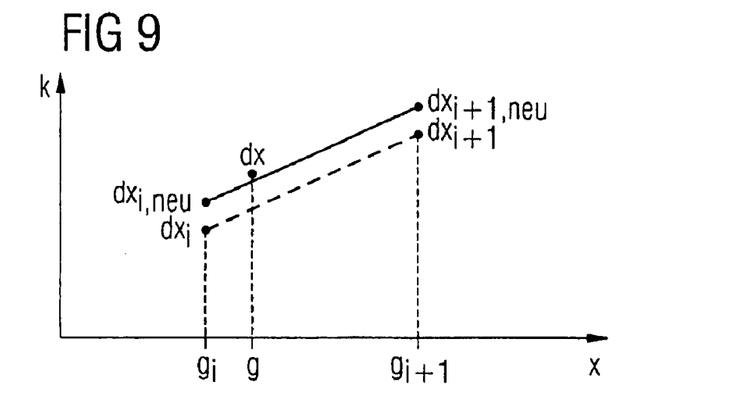
FIG. 9 a fourth approach for adapting adjacent compensation values to a new compensation value at the measurement point.

Approach 4 (graphically illustrated in FIG. 9):
An intermediate approach between Approaches 2 and 3 proposes $0<\lambda\leq1$ by setting $$dx_{i,neu}=dx_i+\lambda c,dx_{i+1,neu}=dx_{i+1}+\lambda c.$$

Independent of which of the above Approaches is selected for updating the compensation data, the remaining positioning error dx at the position g becomes smaller with each update.

The number of the preset operating points increases with a third power of the decreasing mutual spacing between the grid points. For this reason, a compromise has to be made between the reserved memory space in the controller and the accuracy in the workspace A. For a repeated machining operations, advantageously as many measurement points as possible should be measured and taken into account along the programmed contour.

The aforedescribed invention improves also the following two, previously disadvantageous features:

The absence of actual machining forces when the compensation values are determined, Transfer to the SEC of changes in the positioning differences due to temperature variations only if such changes are measured at the grid points.

If the external measurement system is not capable of providing spatial coordinates at the operating points at a rate necessary for real-time operation, then the measurement results cannot be processed online. A series of measurements can be generated while the part is machined, and be used subsequently to update the SEC data. This provides updated compensation data when the next part is machined.

The position of the operating points is recorded at different times with an external measurement system and a measurements record is produced. Synchronously thereto, the actual position values are measured in the controller and also recorded in the position record.

The following requirements and solution trials for adaptation of the compensation value may have to be considered when implementing the method of the invention with existing numeric controllers:

As little as possible should be changed when the SEC is implemented in the controller. Any increase in the computation effort should be minimal. The SEC data should be updated externally due to the exceptional access to the data of the controller, for example as an application running on a Human Machine Interface (HMI).

If the measurement points accumulate at certain positions, then the determined composition values carry more weight.

If two measurement points are closely spaced, then an average value of the associated compensation values can be used for updating the compensation table and/or the SEC table. This occurs, for example, in bidirectional finishing of free-form surfaces, when the two measurement points on adjacent rows are located next to each other. The opposing machining forces can cause significantly different compensation values.

The measurement points have local effects. Corrections of the SEC compensation values derived from the measurement points only affect grid points in close proximity.

The aforedescribed method of the invention for adapting compensation values will now be described with reference to an embodiment, in particular a software-implemented embodiment.

A compensation value is associated with each point in space via the SEC. The dimensions of a compensation value are independent of each other. Accordingly, the following discussion will be restricted to one-dimensional compensation. The other dimensions can be treated in an analogous manner.

Figure 10:
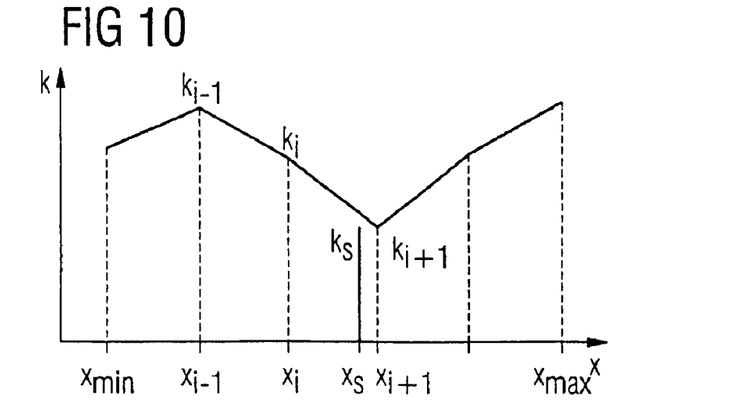
FIG. 10 an exemplary one-dimensional curve of compensation values depending on a spatial dimension.

In the simplest case, the SEC depends only on one spatial dimension of the point, which is independent of the other two coordinates. FIG. 10 depicts the curve form of the compensation value k as a function of the X-coordinate. The constant spacing between grid points is $\Delta x=x_{i+1}-x_i$. The compensation values k have only a local weight in that changes of $k_l$ only affect the interval $]x_{l-1},x_{l+1}[$. A measurement point at the location $x_s \in ]x_{i-1}, x_{i+1}[$ shall be designated $k_s$. This new measurement point can be included in different ways:

The first solution trial is directed to a uniform adaptation of adjacent compensation values. A diagram of the results is depicted to in FIG. 11, wherein the original curve of the compensation values k is shown as a dashed line, the updated curve as a continuous line. Although the computation of new measurement points is very simple, the second measurement value always dominates in the interval $]x_{l-1}, x_{i+1}[$. Neither the preceding compensation values nor the original compensation values are taken in consideration. If $x_s$ is close to $x_{l+1}$, then $k_l$ is shifted by the same amount as $k_{l+1}$.

Figure 11:
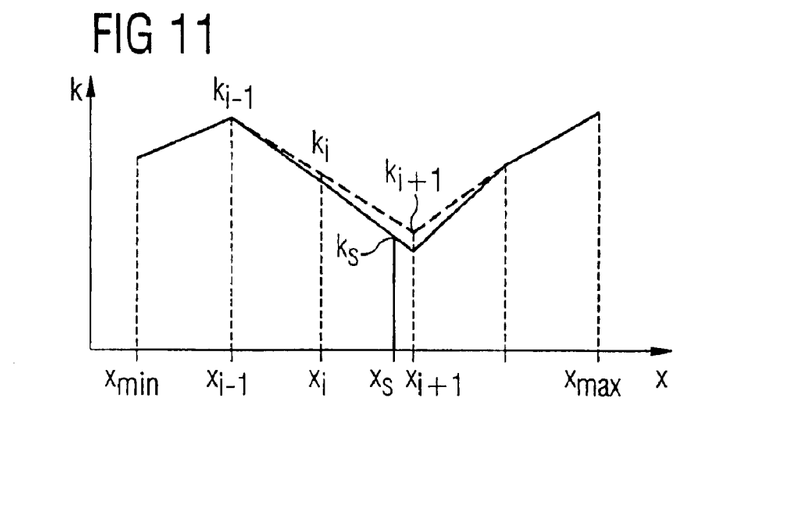
FIG. 11 an approach for uniform adaptation of adjacent compensation values to a new compensation value at the measurement point.

This can be expressed by the following formulas $$dk = k_s - \frac{x_{i+1} - x_s}{\Delta x} k_i - \frac{x_s - x_i}{\Delta x} k_{i+1} \tag{1}$$

$$k_i := k_i + dk_i, \quad k_{i+1} := k_{i+1} + dk \tag{2}$$

Figure 12:
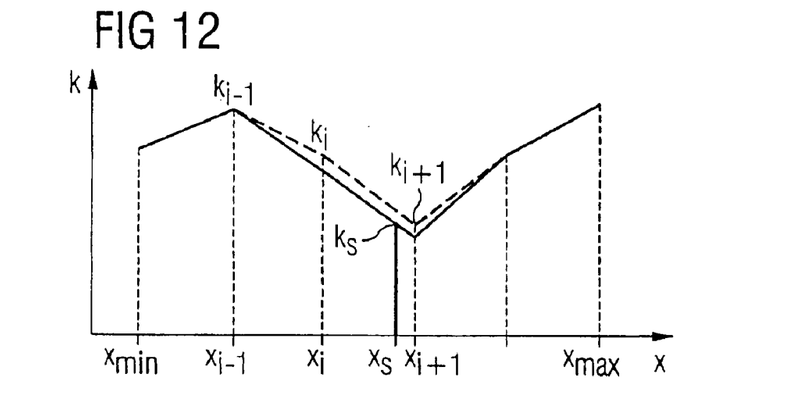
FIG. 12 an approach for weighted adaptation of adjacent compensation values to a new compensation value at the measurement point.

Another solution trial of the invention represents a weighted adaptation of adjacent compensation values. The weighted distribution of the compensation values compensates for some of the disadvantageous features of the aforedescribed embodiment. Like in the first solution try, the measurement points are assumed to be absolutely accurate. The updated compensation curve goes exactly through the measurement point. The result is shown in the diagram of FIG. 12.

The solution trial:

$$k_s = \frac{x_{i+1} - x_s}{\Delta x}(k_i + dk_i) + \frac{x_s - x_i}{\Delta x}(k_{i+1} + dk_{i+1}), \tag{3}$$

$$dk_l(x_s - x_l) = dk_{l+1}(x_{l+1} - x_s) \tag{4}$$

yields the following solution, if $x_s > x_i$:

$$dk_{i+1} = [k_s \Delta x - k_i(x_{i+1} - x_s) - k_{i+1}(x_s - x_i)] \cdot \frac{x_s - x_i}{2(x_s - x_i)^2 - 2\Delta x(x_s - x_i) + \Delta x^2} \tag{5}$$

$$dk_i = \frac{x_{i+1} - x_s}{x_s - x_i} dk_{i+1} \tag{6}$$

For $x_s = x_i$ $dk_l = 1, dk_{l+1} = 0$.

For $x_s = x_i$ one obtains $dk_i = dk_{i+1} = dk$, which represents the same change in the compensation data as for a uniform adaptation.

However, in many cases the compensation data exhibitgreater changes, e.g. $k_i = k_{l+1}$ and $x_s = 0.3x_l + 0.7x_{l+1}$. In this case, the change of the (i+1)th compensation value is $dk_{i+1} = 1.2(k_s - k_i)$, i.e., approximately 20 percentgreater than the difference between the values.

Based on the discussions above, the following possibilities exist for including a measurement point into the grid.

All the aforedescribed method work less well if several measurement points are located inside, before or after the interval $]x_i, x_{i+1}[$ and have to be treated equally. To improve situation, the weight w of the compensation value $k_i$ will now be considered.

Figure 13:
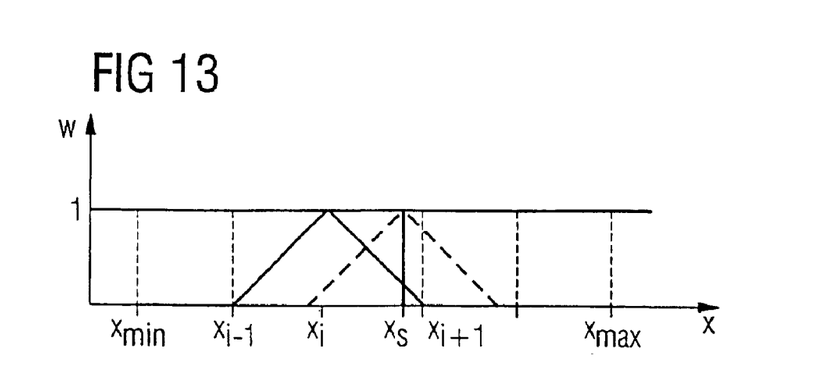
FIG. 13 a schematic diagram of the effect of a compensation value.

The weight w has the effect in the interval $]x_l, x_{l+1}[$ as depicted in FIG. 13. The weight of all compensation data adds up to 1 which is constant. The weight function $w_l$ is defined as:

$$w_i(x) = \begin{cases} \frac{x - x_{i-1}}{\Delta x}, & x_{i-1} \le x \le x_i \\ \frac{x_{i+1} - x}{\Delta x}, & x_i < x \le x_{i+1} \\ 0, & \text{otherwise.} \end{cases} \tag{7}$$

If the grid has $n_x$ points, then the compensation value is computed at the location x as $$\hat{k}(x) = \sum_{i=1}^{n_x} w_i(x) k_i, \quad x_{\min} \le x \le x_{\max}. \tag{8}$$

By adding the measurement point at the location $x_s$, the new compensation value is computed with the help of the weight function $$w_s(x) = \begin{cases} \frac{x - x_s}{\Delta x} + 1, & x_s - \Delta x \le x \le x_s \\ \frac{x_s - x}{\Delta x} + 1, & x_s < x \le x_s + \Delta x \\ 0, & \text{otherwise} \end{cases} \tag{9}$$

according to the formula $$\tilde{k}(x) = \frac{1}{1 + \lambda w_s(x)} \left( \sum_{i=1}^{n_s} w_i(x) k_i + \lambda w_s(x) k_s \right), \quad x_{\min} \le x \le x_{\max} \tag{10}$$

The parameter $\lambda$ can be used to assign more weight the measurement points than to the grid points. For example, if a measurement point coincides with a grid point $x_l$, then the compensation value $\tilde{k}(x_l)$ for $\lambda = 1$ is the average of the original value and the measured value, whereas for $\lambda = 9$ $\tilde{k}(x_l)$ is spaced from $k_i$ only by a tenth of the distance between $k_l$ and $k_s$. With this method, an arbitrary number of additional measurement points can be taken into account. The method can also be easily extended to several dimensions.

For determining a compensation function f with grid points and measurement points, the prescription (10) for computing a three-dimensional lattice with several existing measurement points will now be described for sake of completeness.

The cuboid or workspace A of a machine tool to be compensated shall be defined by the boundaries $x_{min}$, $x_{max}$, $y_{min}$, $y_{max}$, $z_{min}$, $z_{max}$. By specifying the interval numbers $n_x$, $n_y$, and $n_z$, a regular lattice $$G := \{g_{ljk} := (x_{min} + i \cdot \Delta x, y_{min} + j \cdot \Delta y, z_{min} + k \cdot \Delta z) \in \mathfrak{R}^3 | 0 \le i \le n_x, 0 \le j \le n_y, 0 \le k \le n_z\}$$

is defined using the following abbreviations $$\Delta x := \frac{x_{\max} - x_{\min}}{n_x}, \quad \Delta y := \frac{y_{\max} - y_{\min}}{n_y}, \quad \Delta z := \frac{z_{\max} - z_{\min}}{n_z}. \tag{12}$$

$h_{ljk}$ shall be the compensation value at point $g_{ljk}$.

It is assumed that m measurement points $\{(x_s, y_s, z_s)\}_{s=1,\ldots,m}$ exist with associated compensation values $\{h_s\}_{s=1,\ldots,m}$. With the help of the one-dimensional weighting function $w: \mathfrak{R} \times \mathfrak{R}^+ \times \mathfrak{R} \to \mathfrak{R}$, $$w(p, dp, u) := \begin{cases} \dfrac{u-p}{dp}, & p - dp \le u \le p \\ \dfrac{p+dp-u}{dp}, & p < u \le p + dp \\ 0, & \text{otherwise} \end{cases} \quad (11)$$

the three-dimensional weight functions $w_{ijk}:\Re^3 \to \Re$ are defined according to $$w_{ijk}(x,y,z) := w(x_{min}+i\cdot\Delta x, \Delta x, x) \cdot w(y_{min}+j\cdot\Delta y, \Delta y, y) \cdot w(z_{min}+k\cdot\Delta z, \Delta z, z) \quad (12)$$

for $0 \le i \le n_x$, $0 \le j \le n_y$, $0 \le k \le n_z$ and $(x,y,z) \in \Re^3$ as well as $w_s: \Re^3 \to \Re$, $$w_s(x,y,z) := w(x_s, \Delta x, x) \cdot w(y_s, \Delta y, y) \cdot w(z_s, \Delta z, z) \text{ for } s=1,\ldots,m. \quad (13)$$

Since $$\sum_{k=0}^{n_z}\sum_{j=0}^{n_y}\sum_{i=0}^{n_x} w_{ijk}(x,y,z) = 1$$

=1 within the defined cuboid, the compensation function of the SEC is $$S_{ec}(x,y,z) := \sum_{k=0}^{n_z}\sum_{j=0}^{n_y}\sum_{i=0}^{n_x} w_{ijk}(x,y,z) \cdot h_{ijk} \quad (14)$$

The compensation function—with the measurement values also considered—is $$f(x,y,z) := \frac{1}{\sum_{k=0}^{n_z}\sum_{j=0}^{n_y}\sum_{i=0}^{n_x} w_{ijk}(x,y,z) + \lambda \sum_{s=1}^{m} w_s(x,y,z)} \quad (15)$$

$$\left( \sum_{k=0}^{n_z}\sum_{j=0}^{n_y}\sum_{i=0}^{n_x} w_{ijk}(x,y,z) \cdot h_{ijk} + \lambda \sum_{s=1}^{m} w_s(x,y,z) \cdot h_s \right)$$

$$= \frac{1}{1+\lambda\sum_{s=1}^{m} w_s(x,y,z)} \left( S_{ec}(x,y,z) + \lambda \sum_{s=1}^{m} w_s(x,y,z) \cdot h_s \right)$$

This function satisfies the requirements (2), (3) and (4) and should therefore be simulated as best as possible in the controller. A direct implementation in the controller requires a substantial increase in the computation power and the data volume. Accordingly, the compensation values $\tilde{h}_{ljk}$, which best approximate the modified compensation function with the implemented SEC, are determined via a correcting computation.

Best suited here is a "Least Square Method"—initially with a local solution.

New compensation values $\tilde{h}_{ljk}$ are computed with a quadratic correcting computation which produces a minimum mean quadratic difference in the values at the grid points as well as at the measurement points. $\tilde{S}_{ec}$ designates the SEC function based on $\tilde{h}_{ljk}$. The least square (LQ) problem can be expressed as follows:

$$\text{Minimize } Opt = \sum_{k=0}^{n_z}\sum_{j=0}^{n_y}\sum_{i=0}^{n_x} (f(g_{ijk}) - \tilde{S}_{ec}(g_{ijk}))^2 +$$

-continued $$\kappa \sum_{l=1}^{m} (f(x_l, y_l, z_l) - \tilde{S}_{ec}(x_l, y_l, z_l))^2$$

with the boundary conditions $\tilde{h}_{ljk} \in \Re$.

For added clarity, the measurement points from here on will have the index l, whereas the associated weight functions have the index s.

The factor $\kappa$ can be used to assign more weight to the differences at the measurement point.

The target function of LQ depends on $\tilde{h}_{ljk}$ and can be transformed as follows:

$$Opt = \sum_{k=0}^{n_z}\sum_{j=0}^{n_y}\sum_{i=0}^{n_x} \left( \frac{1}{1+\lambda\sum_{s=1}^{m} w_s(g_{ijk})} \left( h_{ijk} + \lambda\sum_{s=1}^{m} w_s(g_{ijk}) \cdot h_s \right) - \tilde{h}_{ijk} \right)^2 +$$

$$\kappa \sum_{l=1}^{m} \left( \frac{1}{1+\lambda\sum_{s=1}^{m} w_s(x_l, y_l, z_l)} \left( \sum_{k=0}^{n_z}\sum_{j=0}^{n_y}\sum_{i=0}^{n_x} w_{ijk}(x_l, y_l, z_l) \cdot h_{ijk} + \lambda \sum_{s=1}^{m} w_s(x_l, y_l, z_l) \cdot h_s \right) - \sum_{k=0}^{n_z}\sum_{j=0}^{n_y}\sum_{i=0}^{n_x} w_{ijk}(x_l, y_l, z_l) \cdot \tilde{h}_{ijk} \right)^2$$

with the following abbreviations $$a_{ijk} = \frac{1}{1 = \lambda \sum_{s=1}^{m} w_s(g_{ijk})} \quad (16)$$

$$\left( h_{ijk} + \lambda \sum_{s=1}^{m} w_s(g_{ijk}) \cdot h_s \right)$$

$$b_l = \frac{1}{1+\lambda\sum_{s=1}^{m} w_s(x_l, y_l, x_l)} \quad (17)$$

$$\left( \sum_{k=0}^{n_z}\sum_{j=0}^{n_y}\sum_{i=0}^{n_x} w_{ijk}(x_l, y_l, z_l) \cdot h_{ijk} + \lambda \sum_{s=1}^{m} w_s(x_l, y_l, z_l) \cdot h_s \right)$$

It follows $$Opt = \sum_{k=0}^{n_z}\sum_{j=0}^{n_y}\sum_{i=0}^{n_x} (a_{ijk} - \tilde{h}_{ijk})^2 +$$

$$\kappa \sum_{l=1}^{m} \left( b_l - \sum_{k=0}^{n_z}\sum_{j=0}^{n_y}\sum_{i=0}^{n_x} w_{ijk}(x_l, y_l, z_l) \cdot \tilde{h}_{ijk} \right)^2.$$

Opt can be represented as a common quadratic curve fit with $$u_{1+l+n^x \cdot j+n_x \cdot n^y \cdot k} := \tilde{h}_{ljk}, \quad c_{l+l+n_x j+n_x \cdot n_y \cdot k} := a_{ljk},$$

$$d_{l,1+l+n_x j+n_x n_y \cdot k} := w_{ljk}(x_l, y_l, z_l), 1 \le l \le m, 0 \le i \le n_x, 0 \le j \le n_y, 0 \le k \le n_z$$

$n=(n_x+1)\cdot(n_y+1)\cdot(n_z+1)$ and the $(M\times N)$ matrix $D=\{d_{l,t}$ $$Opt = \sum_{i=1}^{n}(u_i - c_i)^2 + \kappa \sum_{l=1}^{m}(D_l \cdot u - b_l)^2 \quad (18)$$

$$= (u-c)^T(u-c) + \kappa(D\cdot u - b)^T(D\cdot u - b)$$

$$= u^T(I + \kappa D^T D)u - 2(c^T + \kappa b^T D)u + c^T c + \kappa b^T b$$

A necessary condition for this expression to have a minimum is a zero value of the gradient.

$$\frac{dOpt}{du} = 2(I + \kappa D^T D)u - 2(c + \kappa D^T b) = 0$$

or $$(I + \kappa D^T D)u = c + \kappa D^T b \quad (19).$$

The optimal compensation values $\tilde{h}_{ljk}$ are obtained by solving this system of linear equations.

Since the matrix on the left side is symmetric and positive definite, it can be best solved using the Cholesky method. Alternatively, a global least-square solution method can be used.

If the function f, unlike in the previous solution, is not only to be approximated at the grid points and measurement points, but also in the remaining space of the cuboid, then the following quadratic problem (IQ) has to be solved:

$$\text{Minimize } OptInt = \int_{z_{min}}^{z_{max}} \int_{y_{min}}^{y_{max}} \int_{x_{min}}^{x_{max}} (f(x,y,z) - \tilde{S}_{ec}(x,y,z))^2 dxdydz$$

with the boundary condition $\tilde{h}_{ljk} \in \Re$.

The target function of IQ depends on the values $\tilde{h}_{ljk}$ and can be transformed as follows:

$$OptInt = \int_{z_{min}}^{z_{max}} \int_{y_{min}}^{y_{max}} \int_{x_{min}}^{x_{max}} \left(f(x,y,z) - \sum_{k=k}^{n_z}\sum_{j=0}^{n_y}\sum_{i=0}^{n_x} w_{ijk}(x,y,z)\cdot \tilde{h}_{ik}\right)^2 dxdydz$$

$$= \int_{z_{min}}^{z_{max}} \int_{y_{min}}^{y_{max}} \int_{x_{min}}^{x_{max}} (f(x,y,z))^2 dxdydz -$$

$$2\int_{z_{min}}^{z_{max}} \int_{y_{min}}^{y_{max}} \int_{x_{min}}^{x_{max}} f(x,y,z)\sum_{k=k}^{n_z}\sum_{j=0}^{n_y}\sum_{i=0}^{n_x} w_{ijk}(x,y,z)\cdot \tilde{h}_{ijk} dxdydz +$$

$$\int_{z_{min}}^{z_{max}} \int_{y_{min}}^{y_{max}} \int_{x_{min}}^{x_{max}} \left(\sum_{k=k}^{n_z}\sum_{j=0}^{n_y}\sum_{i=0}^{n_x} w_{ijk}(x,y,z)\cdot \tilde{h}_{ijk}\right)^2 dxdydz$$

$$= \int_{z_{min}}^{z_{max}} \int_{y_{min}}^{y_{max}} \int_{x_{min}}^{x_{max}} (f(x,y,z))^2 dxdydz -$$

$$2\sum_{k=0}^{n_z}\sum_{j=0}^{n_y}\sum_{i=0}^{n_x}\int_{z_{min}}^{z_{max}} \int_{y_{min}}^{y_{max}} \int_{x_{min}}^{x_{max}} f(x,y,z)w_{ijk}(x,y,z)dxdydz \cdot \tilde{h}_{ijk} +$$

$$\int_{z_{min}}^{z_{max}} \int_{y_{min}}^{y_{max}} \int_{x_{min}}^{x_{max}} \left(\sum_{k=0}^{n_z}\sum_{j=0}^{n_y}\sum_{i=0}^{n_x} w_{ijk}(x,y,z)\cdot \tilde{h}_{ijk}\right)^2 dxdydz$$

$$= \int_{z_{min}}^{z_{max}} \int_{y_{min}}^{y_{max}} \int_{x_{min}}^{x_{max}} (f(x,y,z))^2 dxdydz -$$

$$2\sum_{k=0}^{n_z}\sum_{j=0}^{n_y}\sum_{i=0}^{n_x}\int_{z_{min}}^{z_{max}} \int_{y_{min}}^{y_{max}} \int_{x_{min}}^{x_{max}} f(x,y,z)w(x_{min}++i\cdot \Delta x, \Delta x, x)$$

$$w(y_{min}+j\cdot \Delta y, \Delta y, y)w(z_{min}+k\cdot \Delta z, \Delta z, z)dxdydz\cdot \tilde{h}_{ijk} +$$

$$\int_{z_{min}}^{z_{max}} \int_{y_{min}}^{y_{max}} \int_{x_{min}}^{x_{max}} \left(\sum_{k=k}^{n_z}\sum_{j=0}^{n_y}\sum_{i=0}^{n_x} w_{ijk}(x,y,z)\cdot \tilde{h}_{ijk}\right)^2 dxdydz$$

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method for compensating static positioning errors in guiding a movement of a movable machine element of an industrial processing machine, with a predetermined standard parameter for generating reference variables for one or several drives for controlling the machine element in a predetermined workspace, comprising the steps of:
   providing a compensation table with compensation values for a predetermined number of different operating points in the workspace; setting the compensation values to a value of zero, said compensation values to be added to generated reference variables, determining a suitable compensation value for the reference variables located between the predetermined operating points by interpolating between adjacent compensation values of the compensation table, determining positioning errors occurring during machining and adjusting the compensation values of the compensation table using the determined positioning errors by either replacing an existing associated compensation value with a new compensation value corresponding to the additional positioning error, if the positioning error coincides with a predetermined operating point, or by correcting the points of the compensation table adjacent to the corresponding measurement point at least partially according to the determined positioning error.

2. A method for compensating static positioning errors in guiding a movement of a movable machine element of an industrial processing machine, with a predetermined standard parameter for generating reference variables for one or several drives for controlling the machine element in a predetermined workspace, comprising the steps of:

measuring possible first positioning errors for a predetermined number of different operating points in the workspace, storing the measured first positioning errors as compensation values in a compensation table, said compensation values to be added to the generated reference variables, determining a compensation value for reference variables located between the predetermined operating points by interpolating between adjacent compensation values of the compensation table, determining additional positioning errors occurring during machining and adjusting the compensation values of the compensation table with the determined additional positioning errors by either replacing an existing associated compensation value with a new compensation value corresponding to the additional positioning error, if the positioning error coincides with a predetermined operating point, or by correcting the points of the compensation table adjacent to the corresponding measurement point at least partially according to the determined positioning error.

3. The method of claim 1 or 2, and further including the step of extending the compensation table with the corresponding measurement point end the compensation value that corresponds to the positioning error determined at that measurement point, if the positioning error does not coincide with a predetermined operating point.

4. The method of claim 3, wherein if positioning errors during machining are measured at closely spaced measurement points, the compensation table is extended with entry representing an average value of the associated compensation values.

5. The method of claim 3, wherein positioning errors occurring during machining are measured as a series of measurements and the compensation table is updated with associated compensation values after machining.

6. The method of claim 1, and further comprising the step of determining positioning errors occurring during machining with an external measurement system, wherein the externally measured positioning error is measured simultaneously with a reference variable.

7. The method of claim 2, and further comprising the steps of determining first positioning errors with a machine, internal measurement system, and determining positioning errors occurring during machining with a separate external measurement system, wherein the externally determined positioning error is measured simultaneously with a reference variable.

8. The method of claim 6 or 7 wherein for minimizing positioning errors, the external measurement system is adjusted during startup of the machine.

9. The method of claim 1 or 2, wherein the compensation table is formed as a date array.

10. The method of claim 1 or 2, wherein for each degree of freedom of the processing machine, a travel path of the machine element is subdivided into equidistant intervals.

11. The method of claims 1 or 2, wherein each dimension of the workspace is described by a minimal value, a maximum volume and a number of equidistant intervals.

12. The method of claim 1 or 2, wherein exactly two compensation values of adjacent operating points of the compensation table are corrected according to the determined positioning error, if the measurement point of a positioning error occurring during machining is located exactly between two such predetermined operating points.

13. The method of claims 1 or 2, wherein exactly four compensation values of a rectangle formed by four adjacent operating points of the compensation table are corrected according to the determined positioning error, if the measurement point of a positioning error occurring during the machining operation is located in the interior of the rectangle.

14. The method of claim 1 or 2, wherein if the measurement point of a positioning error occurring during machining is neither located exactly between compensation values of adjacent operating points of the compensation table nor located in the interior of a rectangle formed by four adjacent operating points of the compensation table, then eight compensation values of the operating points adjacent to the measurement point of a positioning error occurring during machining are corrected in the compensation table according to the determined positioning error.

15. The method of claim 1 or 2, wherein adjacent compensation values for one or several coordinates are each corrected by setting the compensation values adjacent to the measurement point equal to the new compensation value associated with the determined positioning error.

16. The method of claims 1 or 2, wherein adjacent compensation values for one or several coordinates are each corrected by shifting a straight line extending front one compensation value adjacent to the measurement point to another adjacent compensation value so that a straight line extends through the new compensation value associated with the determined positioning error, whereby the end points of the shifted straight line represent the corrected compensation values.

17. The method of claim 1 or 2, wherein adjacent compensation values for one or several coordinates are each corrected by assuming $$g = (1-t)g_i + tg_{i+1} \text{ with } 0 < t < 1 \text{ and}$$

$$c = dx - (1-t)dx_i - tdx_{i+1}.$$

wherein (dx) is the new compensation value associated with the determined positioning error, $(dx_i)$ is a first compensation value at the grid point $(g_i)$ adjacent to the measurement point (g) and $(dx_{i+1})$ is an adjacent second compensation value at the grid point $(g_{i+1})$, wherein the new compensation values ($dx_{i,neu}$, $dx_{i+1,neu}$) at the grid points ($g_i$, $g_{i+1}$) adjacent to the measurement point (g) are defined according to $$dx_{i,neu}=dx_i+c \text{ and}$$

$$dx_{i+1,neu}=dx_{i+1}+c.$$

18. The method of claim 1 or 2, wherein adjacent compensation values for one or several coordinates are each corroded by assuming $$g=(1-t)g_i+tg_{i+1} \text{ with } 0<t<1 \text{ and}$$

$$c=dx-(1-t)dx_i-tdx_{i+1} \text{ with}$$

wherein (dx) is the new compensation value associated with the determined positioning error, ($dx_i$) is a first compensation value at the grid point ($g_i$) adjacent to the measurement point (g) and ($dx_{i+1}$) is an adjacent second compensation value at the grid point ($g_{i+1}$), wherein the new compensation values ($dx_{i,neu}$, $dx_{i+1,neu}$) at the grid points ($g_i$, $g_{i+1}$) adjacent to the measurement point (g) are defined according to $$dx_{i,neu}=dx_i+(1-t)c \text{ and}$$

$$dx_{i,neu}=dx_{i+1}+tc.$$

19. The method of claim 1 or 2, wherein positioning errors occurring during machining are measured as a series or measurements and the compensation values of the compensation table are suitably adapted after machining.

20. The method of claim 1 or 2, wherein compensation values are assigned a greater weight for measurement points with measured positioning errors that during machining accumulate at or proximate to certain positions.

21. The method of claim 1 or 2, wherein adjacent compensation values for one or more coordinats are corrected by distributing the new compensation value associated with the measured positioning error at the measurement point over the adjacent compensation values with a weight assigned according to the position or value of the new compensation value.

22. The method of claim 21, wherein the method is executed automatically during start-up of the processing machine, in that the desired positions in the operating space are accessed via a corresponding parts programs using travel commands for the defined nominal values, and the attained actual positions are measured after the corresponding position is reached and transferred to a machine controller, where the deviations are measured as positioning errors and entered with the associated positions into the compensation table.

23. The method of claim 1 or 2, wherein the positioning error comprises at least one of a static positioning error and an orientation error.

24. Use of the method of claim 1 or 2 for at least one of quality control and quality assurance in an industrial processing machine.

25. The method of claim 1 or 2, whereby the workspace of the processing machine has a cuboid shape and further including the steps of subdividing the workspace into a three-dimensional grid structure with grid points determining the operating points, and storing a difference between a nominal position and a measured actual position for the grid points in a data field of the compensation table.

26. The method of claim 7, wherein the machine-internal measurement system is matched to the external measurement system.

27. The method of claim 2, and further comprising generating a compensation table by:

defining nominal positions for the machine elements for a predetermined number of different operating points in the workspace, determining positioning errors by comparing the respective nominal position and actual position of the machine elements for each of these operating points, placing the respective nominal position and measured positioning error into a compensation table, and taking into account the positioning errors of the compensation table as compensation values by either adding the compensation values to the defined nominal values in the respective nominal positions for generating reference variables for the drives, or by interpolating the compensation values of the compensation table in the intervals between the corresponding nominal positions.

* * * * *